United States Patent
Grosso et al.

(10) Patent No.: US 8,221,902 B2
(45) Date of Patent: Jul. 17, 2012

(54) OXYFLUORIDE IN THE FORM OF A FILM AND PREPARATION METHOD

(75) Inventors: David Grosso, Cheptainville (FR); Cédric Boissiere, Villebon sur Yvette (FR); Clément Sanchez, Bure sur Yvette (FR)

(73) Assignees: Centre National de la Recherche Scientifique, Paris (FR); Universite Pierre et Marie Curie, Paris (FR)

( * ) Notice: Subject to any disclaimer, the term of this patent is extended or adjusted under 35 U.S.C. 154(b) by 887 days.

(21) Appl. No.: 12/094,256

(22) PCT Filed: Nov. 13, 2006

(86) PCT No.: PCT/FR2006/002510
§ 371 (c)(1),
(2), (4) Date: Sep. 19, 2008

(87) PCT Pub. No.: WO2007/057551
PCT Pub. Date: May 24, 2007

(65) Prior Publication Data
US 2009/0305028 A1  Dec. 10, 2009

(30) Foreign Application Priority Data
Nov. 17, 2005  (FR) ..................... 05 11659

(51) Int. Cl.
*B32B 9/00* (2006.01)
*B05D 3/02* (2006.01)
(52) U.S. Cl. .................... 428/688; 427/372.2
(58) Field of Classification Search .......... None
See application file for complete search history.

(56) References Cited

U.S. PATENT DOCUMENTS

| | | | |
|---|---|---|---|
| 4,492,721 A | 1/1985 | Joosten et al. | |
| 5,051,278 A | 9/1991 | Paz-Pujalt | |
| 5,271,956 A | 12/1993 | Paz-Pujalt | |
| 5,997,621 A | 12/1999 | Scholz et al. | |
| 6,486,245 B1 | 11/2002 | Thuenemann et al. | |
| 6,881,491 B2 * | 4/2005 | Jankosky et al. | 428/472.2 |

FOREIGN PATENT DOCUMENTS

| | | |
|---|---|---|
| EP | 0 416 119 A1 | 3/1991 |
| WO | WO 02/089175 A1 | 11/2002 |
| WO | WO 2004/075308 A2 | 9/2004 |
| WO | WO 2005/081710 A2 | 9/2005 |
| WO | WO 2005/097695 A2 | 10/2005 |
| WO | WO 2005/120154 A2 | 12/2005 |

OTHER PUBLICATIONS

Fujihara, S. et al., "Controlling Factors for the Conversion of Trifluoroacetate Sols into Thin Metal Fluoride Coatings", Journal of Sol-Gel Science and Technology, Kluwer Academic Publishers, 2000, pp. 311-314, vol. 19, XP-002392199.
Tada, M. et al., "Sol-gel processing and characterization of alkaline earth and rare-earth fluoride thin films", Journal of Materials Research, Materials Research Society, Apr. 1999, pp. 1610-1616, vol. 14, No. 4, XP-002392202.
Ruessel, C., "A pyrolytic route to fluoride glasses. I. Preparation and thermal decomposition of metal trifluoroacetates", Journal of Non-Crystalline Solids, Elsevier Science Publishers B.V., 1993, pp. 161-166, vol. 152, XP-002392200.
Fujihara, S. et al., "Sol-gel synthesis of inorganic complex fluorides using trifluoroacetic acid", Journal of Fluorine Chemistry, Elsevier Science S.A., 2000, pp. 65-70, vol. 105, XP-004216206.
Fujihara, S. et al., "Preparation and characterization of $MgF_2$ thin film by a trifluoroacetic acid method", Thin Solid Films, Elsevier Science S.A., 1997, pp. 252-255, vol. 304, XP-002392201.
Fujihara, S. et al., "Sol-Gel Preparation and Optical Properties of $MgF_2$ Thin Films Containing Metal and Semiconductor Nanoparticles", Scripta Materialia, Elsevier Science Ltd., 2001, pp. 2031-2034, vol. 44, XP-002451700.
Bausa', L. E. et al. "$CaF_2:Er^{3+}$ molecular beam epitaxial layers as optical waveguides", Appl. Phys. Lett., Jun. 3, 1996, pp. 3242-3244, vol. 68, No. 23, XP-002451702.
International Search Report dated Oct. 4, 2007 (Seven (7) pages).

* cited by examiner

*Primary Examiner* — Sheeba Ahmed
(74) *Attorney, Agent, or Firm* — Merchant & Gould

(57) ABSTRACT

The invention relates to a nanostructured porous oxyfluoride film deposited onto a substrate, to a method for its production, and also to various applications.
The oxyfluoride has a porous semicrystalline structure and a refractive index of 1.08 to 1.25, measured in the visible range for a relative humidity level below 80%. Its chemical composition corresponds to the formula $(Mg_{(1-x)}Ca_x)_{(1-y)}M_yF_{(2+(n-2)y-2z-t)}O_z(OH)_tM'_w$ in which n is the valency of M, n being 1 to 4, M represents at least one element chosen from Al, Si, Ge and Ga, M' represents at least one element chosen from the group composed of Co, Cr, Ni, Fe, Cu, Sb, Ag, Pd, Cd, Au, Sn, Pb, Ce, Nd, Pr, Eu, Yb, Tb, Dy, Er and Gd, and $0 \leq w < 0.1$; $0 \leq x \leq 1$; $0 \leq y \leq 0.5$; $z<1$; $z+t>0$ and $t<2$.

24 Claims, 2 Drawing Sheets

OXYFLUORIDE IN THE FORM OF A FILM AND PREPARATION METHOD

The present invention relates to a nanostructured porous oxyfluoride, to a process for its production, and also to various applications.

BACKGROUND OF THE INVENTION

Materials having a low dielectric constant are sought after in various technical fields such as microelectronics or optics. In various applications, dielectric materials are sought which have, in addition, a low refractive index. Among the materials currently used, porous silicas have the lowest refractive index (1.2), bearing in mind that that of air is 1.002 and that of dense silica is 1.47.

Magnesium fluoride has a relatively low refractive index and various methods for preparing it are known.

A method is known from JP-05-105424 for preparing an antireflective film of $MgF_2$, that consists in applying, to a substrate, a solution containing either an Mg precursor and an F precursor, or fine particles of $MgF_2$. The Mg precursor may be a sulfate, a nitrate or a phosphate that may or may not be hydrated, or an alkoxide. The F precursor is an alkali metal or quaternary ammonium fluoride.

Known from Fujihara, et al. [Scripta Mater. 2001, 44, 2031-2034] is a method for preparing $MgF_2$ films that contain Ag nanoparticles via a sol-gel route. The method consists in preparing a solution of magnesium acetate in isopropanol and in adding thereto $CF_3COO_2H$ and $H_2O$, then silver acetate, in stirring the solution for 2 hours, then in applying it to a silica glass substrate by spin coating. Next, the coated substrate is subjected to a heat treatment at 300° C.-500° C. for 10 minutes in air, followed by quenching. The refractive index of the product obtained depends on the temperature of the heat treatment; it is 1.31 for 300° C., 1.29 for 400° C. and 1.25 for 500° C.

Known from Fujihara, et al. [Thin Solid Films, 2001, 389, 227-232] is a method for preparing $MgF_2$ films containing ZnO nanoparticles via a sol-gel route. The method comprises a step of preparing a solution of magnesium acetate in isopropanol IPA with addition of $CF_3COO_2H$ and $H_2O$, a step of stirring the solution for 1 h, then keeping at 90° C. for one week to obtain an acetate precursor gel, and a step of dissolving the gel in IPA, then addition of Zn acetate and methanolamine and stirring of the solution, and a step of applying to a silica glass substrate by spin coating, then immediate heating at various temperatures between 300 and 500° C. for durations of 5 to 14 min depending on the samples. The refractive indices are similar to those mentioned above.

SUMMARY OF THE INVENTION

The objective of the present invention is to provide a material which has a refractive index lower than that of porous silicas, and which has, in addition, good mechanical strength.

A material according to the present invention is composed of an oxyfluoride film on a substrate, characterized in that:
the oxyfluoride has a porous semicrystalline structure, a refractive index of 1.08 to 1.25, measured in the visible range for a relative humidity level below 80%, and a chemical composition corresponding to the formula $(Mg_{(1-x)}Ca_x)_{(1-y)}M_yF_{(2+(n-2)y-2z-t)}O_z(OH)_tM'_w$ in which:
n is the valency of M, n being 1 to 4;
M represents at least one element chosen from Al, Si, Ge and Ga;
M' represents at least one element chosen from the group composed of Co, Cr, Ni, Fe, Cu, Sb, Ag, Pd, Cd, Au, Sn, Pb, Ce, Nd, Pr, Eu, Yb, Tb, Dy, Er and Gd;
$0 \leq w < 0.1$; $0 \leq x \leq 1$; $0 \leq y \leq 0.5$; $z<1$; $t<2$; $z+t>0$; and
the film is composed of a single layer and it has a thickness between 100 nm and 2 μm.

Preferably, z+t is greater than 0.01, more particularly greater than 0.1.

In the porous semicrystalline structure of the material:
the pore volume is greater than or equal to 50%;
the pore diameter is less than or equal to 100 nm; and
the wall of the pores is composed of the assembly of elementary semicrystalline oxyfluoride particles and its thickness is less than or equal to 50 nm.

In one embodiment, the surface of the pores comprises OH groups bonded to one of the metal centers (Mg, Ca, M or M') of the compound, and it has a hydrophilic character.

In another embodiment, the metal centers at the surface of the pores of the compound are complexed by perfluorinated groups (for example, perfluorophosphonate groups). These groups make the surface hydrophobic.

Figure 1:
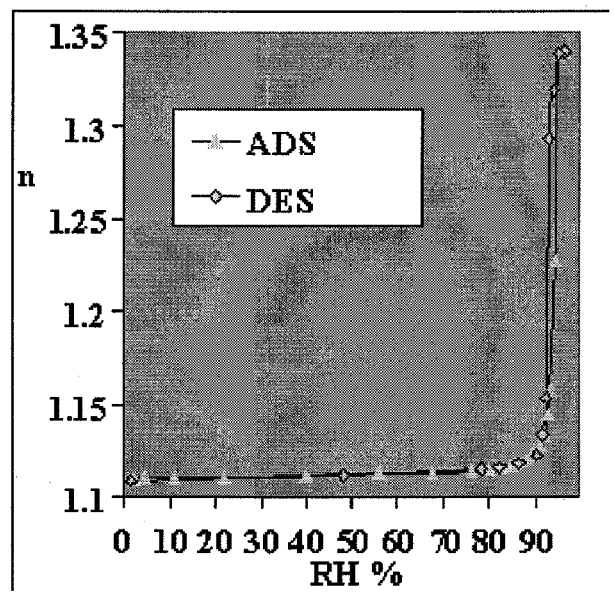
FIG. 1 represents the variation in the refractive index (n) (on the y-axis) as a function of the humidity level (RH %) (on the x-axis).

A material according to the invention for which w=0 is a compound corresponding to the formula

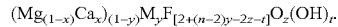
$(Mg_{(1-x)}Ca_x)_{(1-y)}M_yF_{[2+(n-2)y-2z-t]}O_z(OH)_t$.

When y is 0, the oxyfluoride corresponds to the formula $Mg_{(1-x)}Ca_xF_{(2-2z-t)}O_z(OH)_t$.

The oxyfluoride only contains Mg when x=0 and corresponds to the formula $MgF_{(2-2z-t)}O_z(OH)_t$, and only contains Ca when x=1 and it corresponds to the formula $CaF_{(2-2z-t)}O_z(OH)_t$.

When x and/or y are not 0, certain properties of the material may be adjusted by suitably choosing the element or elements M and the value of x and/or y.

The element M' is chosen from the elements commonly used as dopant elements. M' may be, for example, Eu for materials intended for photoluminescence, or Pt for materials intended for hydrogen detection. A material according to the invention for which w≠0 is a compound in which the matrix material is doped by the element or elements M'.

DETAILED DESCRIPTION OF THE PREFERRED EMBODIMENTS

The porous oxyfluorides of the present invention have a very low refractive index, generally between 1.08 and 1.25, measured in the visible range for a relative humidity level below 80%. They are stable in air, at high temperatures (generally up to 600° C.) and in standard solvents such as water or ethanol. They have, in addition, good mechanical stability, determined by a Young's modulus E between 20 and 500 MPa (measured by contraction of the layer perpendicular to the surface under capillary tension with water).

The substrate which bears the oxyfluoride film is preferably chosen from metallic materials or oxides that are known as optical mineral supports. By way of example, mention may be made of silicon, silica, mica, alumina or gold.

When the compounds or the particles are deposited onto an oxyfluoride film according to the present invention, only the pores located directly under the surface of the oxyfluoride film are accessible to the compounds or to the particles, despite the high porosity level and the size of the pores. The underlying pores remain inaccessible.

A material according to the present invention is obtained from one single-layer film of a precursor solution deposited in a single step onto the substrate.

More particularly, the method for preparing an oxyfluoride film comprises the following steps:
- depositing a film onto a substrate from a solution containing at least one Mg precursor and/or at least one Ca precursor, at least one F precursor, optionally at least one M precursor, optionally at least one M' precursor in a volatile solvent;
- evaporation of the solvent and of the possible volatile compounds capable of being formed as byproducts of the reaction between the precursors; and
- heat treatment consisting of a quench at a temperature between 300° C. and 600° C., then maintaining at the quench temperature;

and it is characterized in that the precursor solution film is a single-layer film deposited in a single step onto the substrate, the deposition conditions of said single-layer solution film being chosen so as to obtain, after the heat treatment, a film having a thickness between 100 nm and 2 µm as a single layer.

The solution film may be deposited onto the substrate by conventional liquid deposition processes, such as, for example, spin coating, dip coating or spray coating. The determination of the conditions specific to each technique for depositing the solution film, in order to obtain the desired thickness, is within the capability of a person skilled in the art.

Generally, the solution of precursors has a content of metal ion (Mg, Ca, M and/or M') precursors such that the concentration of metal ions is from 0.1M to 3M, preferably from 0.5M to 1.5M. Moreover, the solution of precursors has a fluorine precursor content such that the FA/MI "fluorine atom"/"metal ions" ratio is from 1 to 20, preferably from 3 to 12.

When the concentration of metal ions in the precursor solution is less than 0.1M, it becomes difficult, or even impossible, to obtain an oxyfluoride layer having a thickness of at least 100 nm in a single deposition step. When the concentration of metal ions in the precursor solution is greater than 3M, the viscosity of the solution is too high to allow a homogeneous film to be obtained.

A decrease in the FA/MI ratio has the effect of decreasing the porosity in the oxyfluoride prepared. When the FA/MI ratio is less than 1, the film obtained after heat treatment has a very low porosity, so much so that the refractive index becomes greater than 1.25. An increase in the FA/MI ratio has the effect of decreasing the wettability of the substrate. When the FA/MI ratio is greater than 20, the wettability of the substrate is too low to allow homogeneous oxyfluoride films to be obtained.

When the oxyfluoride precursors are applied to a substrate by dip coating, said substrate is dipped into a solution of precursors such as defined above, then it is withdrawn therefrom with a rate which determines the thickness of the film. The appropriate withdrawal rate as a function of the concentration of the precursor solution and of the desired film thickness may be determined by routine tests. Generally, a higher concentration allows a lower withdrawal rate in order to obtain a given thickness. For example, for precursor solutions such as defined above, the desired oxyfluoride film thicknesses may generally be obtained with a withdrawal rate of 0.1 to 8 mm per second, preferably from 0.5 to 5 mm per second, under standard temperature and pressure conditions and at a relative humidity between 5% and 80% (typically below 20%).

In one particular embodiment, the heat treatment may be followed by an optional step that aims to make the wall of the pores, and consequently the entire accessible surface of the oxyfluoride film applied to the substrate, hydrophobic.

The solvent of the precursor solution is chosen from volatile organic solvents, for example water, acetone or ethanol.

A precursor of one of the Mg, Ca, M or M' elements may be an organic salt, an inorganic salt, an alkoxide or an organic complex of said element, chosen so that the cationic part combines with $F^-$ originating from the fluorine precursor, $O^{2-}$ originating from ambient $O_2$ and with $OH^-$ originating from the solvent when the solvent is water, or from atmospheric moisture, and that the anion disappears during the heat treatment. As an example, mention may be made of Mg, Ca or M acetate, the tetraethoxysilane Si precursor, and the chlorides of the various M' elements.

A fluorine precursor compound may be chosen from organic compounds comprising a complexing electron-donor group bonded to a fluorinated or perfluorinated group. By way of example, mention may be made of fluoroalkyl or perfluoroalkyl carboxylates and the corresponding acids, in particular trifluoroacetic acid (TFA).

The amount of each of the constituents is chosen as a function of the value of the indices w, x and y.

In all cases, the solvent is evaporated after bringing the solution into contact with the substrate.

The substrate is chosen as a function of the intended application of the oxyfluoride-coated substrate. In the field of microelectronics or optics, the substrates generally used are silica or silicon wafers.

The heat treatment of the film obtained after evaporation of the solvent is advantageously carried out in air or in an inert gas, with a quench at a temperature of 300° C. to 600° C., and a hold at the quench temperature for a duration between 5 min and 24 h.

The material obtained in the form of a film on a substrate by the method of the invention at the end of the heat treatment comprises OH groups bonded to one of the metal centers (Mg, Ca, M or M') of the compound. These groups make the surface of the pores hydrophilic. When the material of the present invention is intended, for example, to form a layer having a low dielectric constant, it is preferable for the surface of the pores to be hydrophobic. The material according to the invention as obtained at the end of the heat treatment may be treated with an agent that comprises hydrophobic groups (for example, perfluorinated groups) and the complexing groups of said metal centers. The application of the complexing agent may be carried out by impregnation techniques in the vapor phase or in solution.

Due to their properties, the materials of the present invention are particularly advantageous:
- in the field of microelectronics, where materials in the form of layers having a low dielectric constant or in the form of insulating layers are sought after; and
- in the field of optics, for producing layers having a low optical density, components in the construction of mirrors, filters, monochromators, polarizers and waveguides.

The materials for which the surface of the pores has been made hydrophobic have the additional advantage of being able to be used in atmospheres with a high humidity, due to the fact that such hydrophobic character prevents the formation of a layer of water on the surface of the pores, and consequently on the surface of the grains of powder or of the film.

The present invention is illustrated by the following examples, to which it is not however limited.

EXAMPLE 1

Preparation of a Magnesium Oxyfluoride Film on a Silicon Substrate Coated with a Silica Film 7.16 g of $Mg(CH_3COO)_2.4H_2O$ were mixed with 50 g of ethanol, 1.5 g of $H_2O$ and 7.35 g of $CF_3COOH$. After dissolving, an Si substrate coated with a silica film having a thickness of 2 nm was dipped into the solution obtained, then it was withdrawn into an atmospheric humidity less than 10% with a withdrawal rate of 2 mm/s. The layer deposited onto the substrate was then transferred under an IR lamp, for which the temperature (of the film) was maintained at 450° C. It remained at this temperature of 450° C. for 10 min. The final deposited oxyfluoride layer had a thickness of 150 nm.

On the sample obtained, the variation in the refractive index was measured by spectroscopic ellipsometry as a function of the ambient humidity, inside a controlled-atmosphere chamber.

FIG. 1 represents the variation in the refractive index (n) (on the y-axis) as a function of the humidity level (RH %) (on the x-axis).

In FIG. 1, the curve ADS represents the change in the index n with the increase of the humidity level, and the curve DES represents the change in the index n with the decrease of the humidity level. It is observed that the refractive index only varies very slightly for humidity levels below 90%, (from 1.11 to 1.13 measured at a wavelength of 700 nm), the variation being reversible and not modifying the properties of the layer.

The pore size distribution (determined by water adsorption/desorption) reveals a very narrow pore size distribution over the entire thickness of the film (cf. water adsorption/desorption isotherm DES in FIG. 1). This data corresponds to very homogeneous films.

Figure 2:
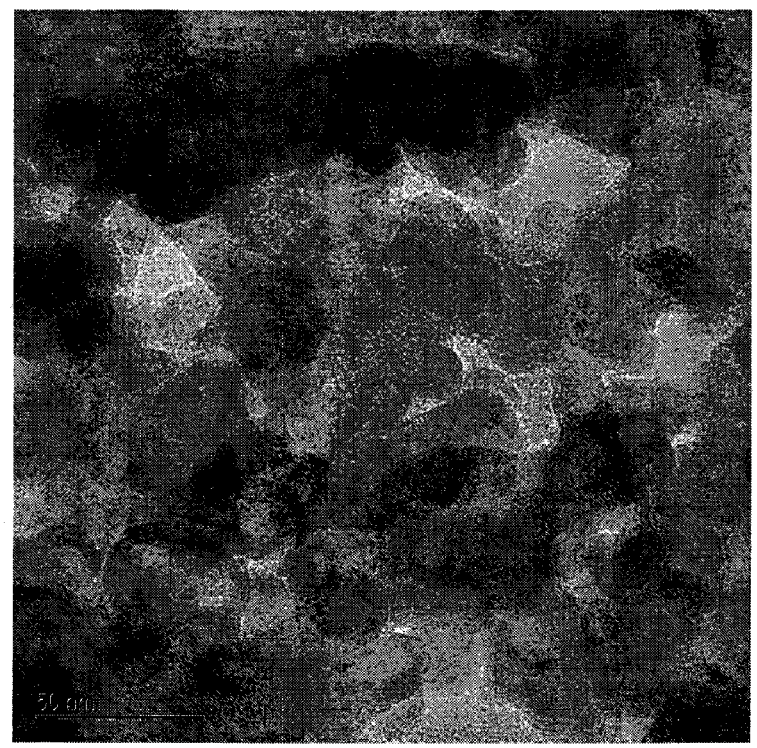
FIGS. 2 and 3 respectively represent the micrographs obtained by analysis of the sample by TEM (transmission electron microscopy) and by AFM (near field microscopy).
Figure 3:
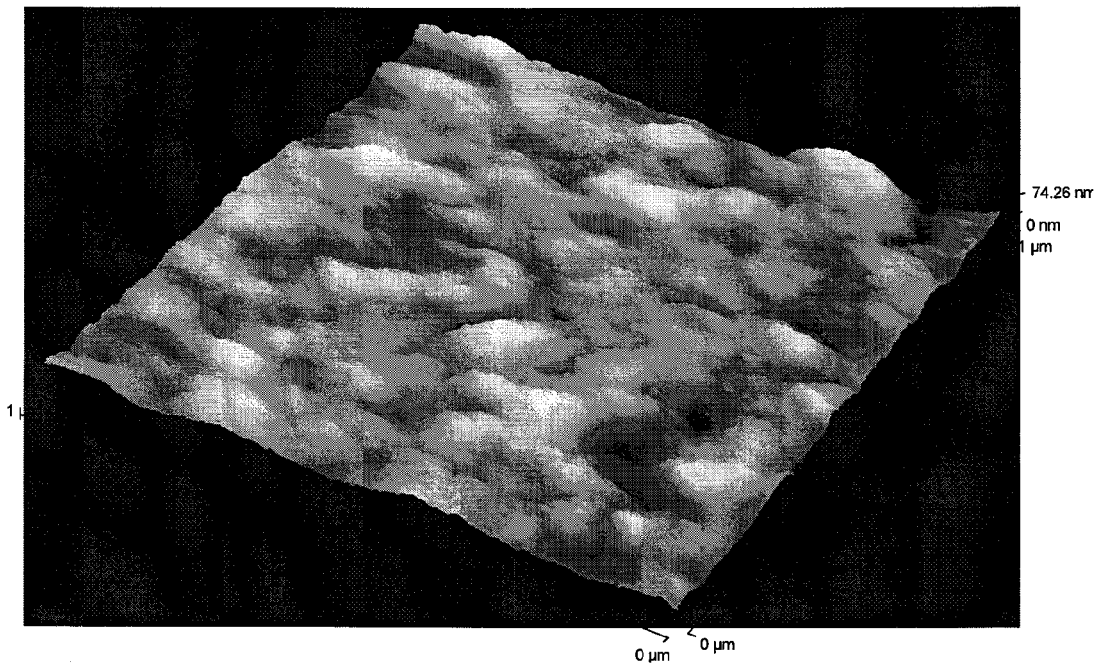

FIGS. 2 and 3 respectively represent the micrographs obtained by analysis of the sample by TEM (transmission electron microscopy) and by AFM (near field microscopy).

Electron diffraction analysis confirmed the crystallinity of the particles, observed by high-resolution TEM (FIG. 2).

In FIG. 3, the sample surface area represented is a square, for which each of the sides is 1 µm, and the height between the highest peak and the lowest trough is 74.25 nm. FIG. 3 shows that the oxyfluoride has a porous structure composed of spherical particles, the average size of which is 20 nm. This results, for the surface of the layer, in a sub-roughness of around 20 nm and larger cavities, of around 50 nm. It has however been verified that the underlying pores remain inaccessible. To verify this point, a layer composed of Ludox® $SiO_2$ particles having a size of 40 nm was deposited onto the surface of the oxyfluoride sample, and it was observed that the Ludox® particles only penetrated into the sample to a depth of 50 nm in the first layer, whereas this layer had a thickness of 150 nm. This penetration caused a variation of the optical properties of the initial layer only to 50 nm below its surface.

Figure 4:
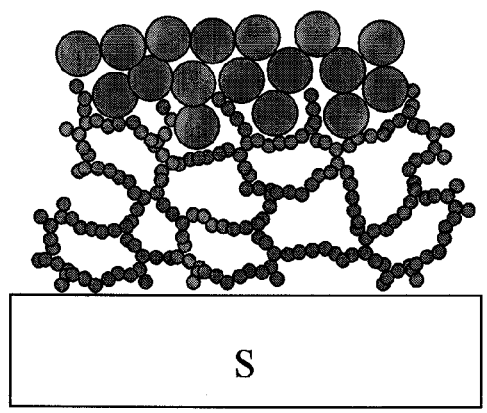
FIG. 4 is a schematic representation of the structure of the sample bearing a surface layer of silica particles.

FIG. 4 is a schematic representation of the structure of the sample bearing a surface layer of silica particles. The beads having the largest diameter represent the Ludox® particles and the beads of smaller diameter represent the semicrystalline oxyfluoride particles. The surface layer is composed solely of Ludox® beads. The layer in direct contact with the substrate S is composed solely of oxyfluoride particles and it has a low refractive index. The intermediate layer represents a layer in which the various particles are interpenetrated.

XPS analysis of the films shows the presence of three main elements (Mg, F and O) in the following atomic proportions: 35% Mg, 40% F, 25% 0, with an error margin of 10%. This data corresponds to the empirical formula $MgF_{1.14}O_{0.15}(OH)_{0.56}$. The deconvolution of the spectra reveals a single population of each element, confirming the homogeneity of the inorganic matrix and its (semi)-crystallinity.

EXAMPLE 2

Preparation of a Hydrophobic Mg Oxyfluoride Film

An oxyfluoride film prepared according to the procedure from example 1 was treated to make the surface of the pores hydrophobic according to the following method. The film was dipped into an aqueous solution containing 1 wt % of a perfluorophosphate (sold under the name Zonyl FSE fluorosurfactant Ref. No. 421391 by Aldrich) for 1 hour. Next, after extraction from the perfluorophosphate solution, the film was washed with plenty of water, then dried at 150° C. for 30 min.

The ellipsometric study of the variation of the refractive index as a function of the humidity revealed a significant increase in the optical density above 95% relative humidity, whereas the limit was 85% for the initial untreated film. The refractive index at low humidity was slightly modified by this grafting: it increased by 0.01-0.02 relative to the index of the film before treatment.

EXAMPLE 3

Preparation of a Ca and Mg Oxyfluoride Film, Doped with $Eu^{2+}$

A magnesium/calcium oxyfluoride ($Eu^{2+}$ doped) film was prepared on a silicon substrate coated with a silica film having a thickness of 2 nm.

A solution containing 7.16 g of $Mg(CH_3COO)_2.4H_2O$, 0.150 g of $Ca(CH_3COO)_2.2H_2O$, 50 g of ethanol, 1.5 g of $H_2O$ and 8 g of $CF_3COOH$ was prepared, then 0.025 g of $EuCl_3.6H_2O$ was added thereto. After dissolving, a single layer of this solution was deposited by dipping an Si substrate into the solution thus obtained, and withdrawing it into an atmospheric humidity below 10% with a withdrawal rate of 2 mm/s. The layer deposited onto the substrate was then transferred under an IR lamp, for which the temperature (of the film) was maintained at 450° C. It remained at this temperature of 450° C. for 10 min. The oxyfluoride layer thus obtained had a thickness of 150 nm.

On the sample obtained, the variation of the refractive index n700 was measured by spectroscopic ellipsometry as a function of the ambient humidity, in a controlled-atmosphere chamber. The results obtained were similar at all points to the variations of the optical properties observed for the sample from example 1. They are given in the following table:

| RH % | 2 | 50 | 70 | 80 | 90 |
|---|---|---|---|---|---|
| n700 | 1.10 | 1.102 | 1.11 | 1.12 | 1.14 |

EXAMPLE 4

Preparation of an Mg and Si Oxyfluoride Film

A magnesium/silicon oxyfluoride film was prepared on a silicon substrate coated with a silica film having a thickness of 2 nm.

7.16 g of $Mg(CH_3COO)_2.4H_2O$, 0.175 g of $Si(CH_3CH_2O)_4$, 50 g of ethanol, 1.5 g of $H_2O$ and 8 g of $CF_3COOH$ were mixed together. A single layer of this solution was deposited by dipping the substrate into the solution thus obtained, and withdrawing it into an atmospheric humidity below 10% with a withdrawal rate of 2 mm/s. The layer deposited onto the substrate was then transferred under an IR lamp, for which the temperature (of the film) was maintained at 450° C. It remained at this temperature of 450° C. for 10 min. The oxyfluoride layer thus obtained had a thickness of 150 nm.

On the sample obtained, the variation of the refractive index n700 was measured by spectroscopic ellipsometry as a function of the ambient humidity, in a controlled-atmosphere chamber. The results obtained were similar to the variations of the optical properties observed for the sample from example 1. The refractive indices measured were between 1.12 and 1.41 (at a wavelength of 700 nm) for 0% and 100% humidity respectively. They are given in the following table:

| RH % | 0 | 2 | 50 | 70 | 80 | 90 | 100 |
|---|---|---|---|---|---|---|---|
| n700 | 1.12 | 1.10 | 1.11 | 1.13 | 1.17 | 1.32 | 1.41 |

EXAMPLE 5

Preparation of an Mg and Al Oxyfluoride Film

A magnesium/aluminum oxyfluoride film was prepared on a silicon substrate coated with a silica film having a thickness of 2 nm.

7.16 g of $Mg(CH_3COO)_2.4H_2O$, 0.100 g of $AlCl_3.6H_2O$, 50 g of ethanol, 1.5 g of $H_2O$ and 8 g of $CF_3COOH$ were mixed together. After dissolving, a single layer of this solution was deposited by dipping the Si into the solution thus obtained, and withdrawing it into an atmospheric humidity below 10% with a withdrawal rate of 2 mm/s. The layer deposited onto the substrate was then transferred under an IR lamp, for which the temperature (of the film) was maintained at 450° C. It remained at this temperature of 450° C. for 10 min. The oxyfluoride layer thus obtained had a thickness of 150 nm. On the sample obtained, the variation of the refractive index n700 was measured by spectroscopic ellipsometry as a function of the ambient humidity, in a controlled-atmosphere chamber. The results obtained were similar to the variations of the optical properties observed for the sample from example 1. The refractive indices measured were between 1.10 and 1.38 (at 700 nm) for 0% and 100% humidity respectively. They are given in the following table:

| RH % | 0 | 2 | 40 | 75 | 80 | 90 | 95 |
|---|---|---|---|---|---|---|---|
| n700 | 1.10 | 1.12 | 1.16 | 1.17 | 1.21 | 1.24 | 1.38 |

EXAMPLE 6

Preparation of a Magnesium Oxyfluoride Film on a Silicon Substrate Coated with a Silica Film Two samples of magnesium oxyfluoride on an opaque silicon substrate having a thickness of 2 nm were prepared, using the method from example 1 under the following conditions:

| Sample | 1 | 2 |
|---|---|---|
| $Mg(CH_3COO)_2 \cdot 4H_2O$ | 7.16 g | 7.16 g |
| Ethanol | 50 g | 50 g |
| $H_2O$ | 1.5 g | 1.5 g |
| Withdrawal rate | 5 mm/s | 5 mm/s |
| Temperature of the heat treatment | 450° C. | 450° C. |
| Duration of the heat treatment | 20 min | 20 min |
| Final thickness of the oxyfluoride layer | 320 nm | 430 nm |

The dielectric constant of each of the samples obtained was determined, using the mercury probe method, by applying a voltage of 0 V and a frequency of 100 kHz. The measurement system was composed of the opaque Si substrate (resistance below 0.007 Ω/cm), the porous oxyfluoride film and the mercury. The results are as follows:

| Sample | 1 | 2 |
|---|---|---|
| n700 | 1.095 | 1.105 |
| Capacitance | 22.37 pF | 15.96 pF |
| Dielectric constant | 1.63 ± 0.05 | 1.57 ± 0.05 |

The invention claimed is:

1. A material comprising an oxyfluoride film on a substrate, wherein:
   a) the oxyfluoride has a porous semicrystalline structure, wherein the pore volume is greater than or equal to 50%, the pore diameter is less than or equal to 100 nm; and the wall of the pores is composed of an assembly of elementary semicrystalline oxyfluoride particles and its thickness is less than or equal to 50 nm; a refractive index of 1.08 to 1.25, measured in the visible range for a relative humidity level below 80%, and a chemical composition corresponding to the formula $(Mg_{(1-x)}Ca_x)_{(1-y)}M_yF_{(2+(n-2)y-2z-t)}O_z(OH)_tM'_w$ in which:
   n is the valency of M, n being 1 to 4;
   M represents at least one element selected from Al, Si, Ge and Ga;
   M' represents at least one element selected from the group consisting of the group consisting of Co, Cr, Ni, Fe, Cu, Sb, Ag, Pd, Cd, Au, Sn, Pb, Ce, Nd, Pr, Eu, Yb, Tb, Dy, Er and Gd;
   $0.1 \leq w \leq 0.1$; $0.1 \leq x \leq 1$; $0 \leq y \leq 0.5$; z<1; t<2; z+t>0; and
   b) the film is composed of a single layer and it has a thickness between 100 nm and 2 μm.

2. The material as claimed in claim 1, wherein the surface of the pores comprises OH groups bonded to one of the metal centers (Mg, Ca, M or M') of the compound.

3. The material as claimed in claim 1, wherein the metal centers at the surface of the pores of the compound are complexed by perfluorinated groups.

4. The material as claimed in claim 1, wherein the substrate is chosen from metallic materials or oxides.

5. The material as claimed in claim 4, wherein the substrate is selected from the group consisting of silicon, silica, mica, alumina or gold.

6. The material as claimed in claim 1, wherein it corresponds to the formula:

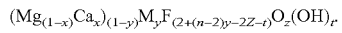
$(Mg_{(1-x)}Ca_x)_{(1-y)}M_yF_{(2+(n-2)y-2z-t)}O_z(OH)_t$.

7. The material as claimed in claim 6, wherein it corresponds to the formula $Mg_{(1-x)}Ca_xF_{(2-2z-t)}O_z(OH)_t$.

8. The material as claimed in claim 7, wherein it corresponds to one of the formulae $MgF_{(2-2z-t)}O_z(OH)_t$ or $CaF_{(2-2z-t)}O_z(OH)_t$.

9. The material as claimed in claim 1, wherein $z+t>0.01$.

10. Method for preparing a material as claimed in claim 1, comprising depositing a single-layer film of a solution of precursors onto a substrate in a single step.

11. The method as claimed in claim 10, comprising the following steps:
depositing a film onto a substrate from a solution containing at least one Mg precursor and/or at least one Ca precursor, at least one F precursor, optionally at least one M precursor, optionally at least one M' precursor in a volatile solvent;
evaporating the volatile solvent and the possible volatile compounds formed as byproducts of the reaction between the precursors; and
heat treatment consisting of a quench at a temperature between 300° C. and 600° C., then maintaining at the quench temperature;
wherein the precursor solution film is a single-layer film deposited in a single step onto the substrate, the deposition conditions of the precursor solution film being chosen so as to obtain, after the heat treatment, a film having a thickness between 100 nm and 2 µm in a single layer.

12. The method as claimed in claim 10, wherein the solution film is deposited onto the substrate by spin coating, dip coating or spray coating.

13. The method as claimed in claim 10, wherein the solution of precursors has a content of metal ion (Mg, Ca, M and/or M') precursors such that the concentration of metal ions is from 0.1M to 3M.

14. The method as claimed in claim 10, wherein the solution of precursors has a fluorine precursor content such that the FA/MI "fluorine atom"/"metal ions" ratio is from 1 to 20.

15. The method as claimed in claim 12, wherein the precursor solution film is deposited onto the substrate by dip coating, the substrate being immersed in the precursor solution, then withdrawn with a withdrawal rate of 0.1 to 8 mm/sec.

16. The method as claimed in claim 10, wherein it comprises an additional step to make the surface of the pores of the material hydrophobic.

17. The method as claimed in claim 10, wherein the solvent is chosen from volatile organic solvents.

18. The method as claimed in claim 10, wherein a precursor of an Mg, Ca, M or M' element is an organic salt, an inorganic salt, an alkoxide or an organic complex of said element, chosen so that the cationic part combines with $F^-$, $O^{2-}$ or $OH^-$ and that the anion disappears during the heat treatment.

19. The method as claimed in claim 11, wherein the fluorine precursor compound is chosen from organic compounds comprising a complexing electron-donor group bonded to a fluorinated or perfluorinated group.

20. The method as claimed in claim 19, wherein the fluorine precursor is chosen from fluoroalkyl or perfluoroalkyl carboxylates and the corresponding acids.

21. The method as claimed in claim 10, wherein the heat treatment is carried out in air or in an inert gas, and it consists of a thermal quench at a temperature between 300 and 600° C. and a hold at the quench temperature for a duration of 5 min to 24 hours.

22. The method as claimed in claim 16, wherein the additional treatment consists in bringing the material obtained after the heat treatment into contact with an agent that comprises hydrophobic groups.

23. A method of producing components for mirrors, filters, monochromators, polarizers, or waveguides comprising forming layers of the material as claimed in claim 1 having low optical density and applying the layers to components for mirrors, filters, monochromators, polarizers, or waveguides.

24. A method of producing components for microelectronics comprising forming layers of the material as claimed in claimed 1 having a low dielectric constant and applying the layers to components for microelectronics.

* * * * *

UNITED STATES PATENT AND TRADEMARK OFFICE
CERTIFICATE OF CORRECTION

| | | |
|---|---|---|
| PATENT NO. | : 8,221,902 B2 | Page 1 of 1 |
| APPLICATION NO. | : 12/094256 | |
| DATED | : July 17, 2012 | |
| INVENTOR(S) | : David Grosso et al. | |

It is certified that error appears in the above-identified patent and that said Letters Patent is hereby corrected as shown below:

Column 10, line 17:

"claim 11" should read "claim 10"

Signed and Sealed this
Twenty-fifth Day of September, 2012

David J. Kappos
*Director of the United States Patent and Trademark Office*